Jan. 12, 1932.   F. H. GULLIKSEN   1,841,117
REGULATOR SYSTEM
Filed Feb. 2, 1931
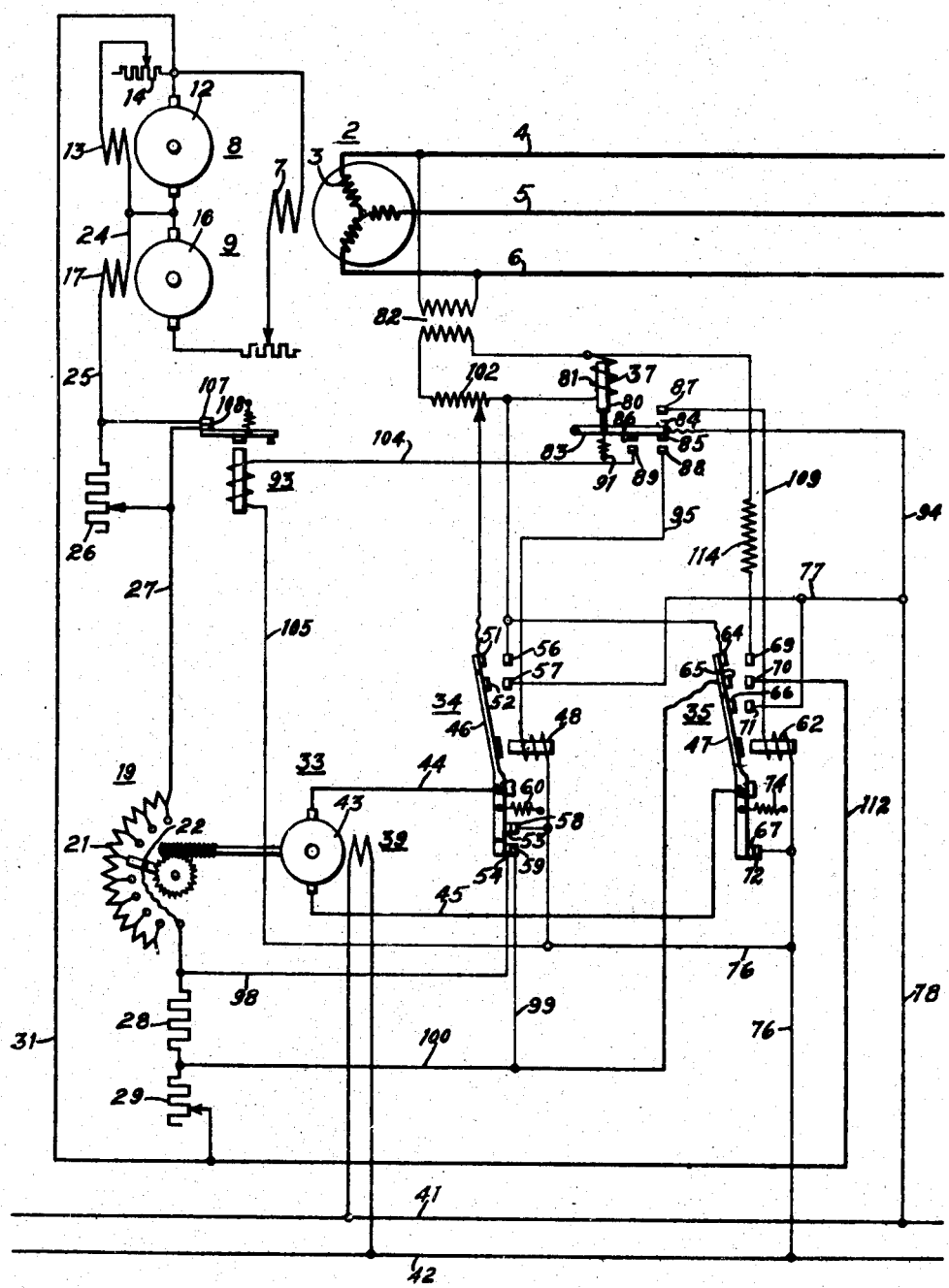
INVENTOR
*Finn H. Gulliksen*
BY
*[signature]*
ATTORNEY Patented Jan. 12, 1932

1,841,117

UNITED STATES PATENT OFFICE

FINN H. GULLIKSEN, OF WILKINSBURG, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed February 2, 1931. Serial No. 512,933.

My invention relates to regulator systems and it has particular relation to regulator systems for governing electrical quantities of dynamo-electric machines.

One object of my invention is to provide a regulator system that shall be quick acting and accurate in its operation.

Another object of my invention is to provide a regulator system with means for forcing the field of the regulated machine during the operation of the regulator for the purpose of producing rapid changes in the regulated quantity.

A further object of my invention is to provide a regulating system of the above indicated character wherein the forcing of the field of the regulated machine is accelerated when the regulated quantity falls below a predetermined value.

When the voltage impressed upon the field winding of an exciter generator is decreased or increased by suddenly inserting resistance into, or shunting resistance from the field-winding circuit, oscillographic tests show that the initial rate of change of exciter-armature voltage is very much higher when the armature voltage is decreasing than it is when the armature voltage is increasing.

My invention utilizes this fact and contemplates the use of a main exciter generator and an auxiliary exciter generator connected in voltage-opposition to govern an electrical quantity, such as voltage, of a dynamo-electric machine. The voltage of the auxiliary exciter generator is regulated to decrease its voltage when it is necessary to increase the voltage of the dynamo-electric machine by employing a motor-operated rheostat in the field circuit of the auxiliary generator. The voltage of the main exciter generator is maintained substantially constant at a value higher than the voltage of the auxiliary generator. Means are provided for rapidly changing the field excitation of the auxiliary generator during the corrective action of the regulator and the exciter field rheostat. The voltage impressed on the field winding of the auxiliary generator may be abruptly varied by the operation of a switch or relay to introduce a resistor into, or exclude a resistor from, the field-winding circuit of the auxiliary generator during the operation of the rheostat in the one or in the other direction.

By this means, a change in the voltage that is temporarily impressed upon the field winding of the auxiliary generator for a required correction in the excitation thereof may be several times the amount required to maintain the desired correction in the excitation, thereby considerably reducing the time required for the desired change in the value of the auxiliary-generator field flux. This arrangement, therefore, produces a rapid change in the voltage generated by the auxiliary generator and, as the two generators are so connected that their generated voltages oppose each other, the voltage produced at the free terminals of the two generators is rapidly varied.

The regulating system may be so arranged that the change in the field excitation of the auxiliary generator may be performed in several steps, depending upon the degree of variation of the regulative quantity from its desired value, so that a relatively small abrupt change is made in the excitation when the variation in the regulated quantity is small, and a relatively large abrupt change is made in the generator excitation when the variation of the regulator quantity from its desired value is correspondingly large.

My invention may be better understood from the following description, when read in conjunction with the accompanying drawing, in which the single figure is a diagrammatic view of apparatus and circuits employed in a preferred embodiment of my invention.

Referring to the drawing, an electric generator 2 is provided having an armature winding 3 that is connected to supply-circuit conductors 4, 5 and 6 and a field winding 7 that is connected to be energized from two exciter generators 8 and 9 that are so connected in series-circuit relation that their generated voltages buck or oppose each other. The main-exciter generator 8 is provided with armature winding 12 and a selfexcited field winding 13 having a regulating rheostat 14 connected in series-circuit relation thereto. The generator 8 is so regulated that substantially constant voltage is maintained across its terminals. As the regulating system employed to maintain the voltage of generator 8 constant forms no part of this invention, it is deemed unnecessary to illustrate or describe it.

The auxiliary-exciter generator 9 is provided with an armature winding 16 and a field winding 17 that is energized from the main generator 8. A motor-operated rheostat 19 is provided having a resistor element 21 and a movable contact arm 22, and is connected in series-circuit with the field winding 17 of the auxiliary exciter generator. The circuit for the field winding 17 extends from the armature winding 12 of the generator 8, through conductor 24, the field winding 17, conductor 25, a resistor 26, conductor 27, the rheostat 19, a resistor 28, a resistor 29 and a conductor 31, to the other side of the armature winding 12 of the generator 8. The rheostat 19 is the primary means for regulating the voltage impressed upon the field winding 17 of the auxiliary exciter generator 9 and the field winding 7 of the generator 2, the reistors 26, 28 and 29 being short circuited under certain operating conditions of the regulating system to be described later.

The regulating rheostat 19 is operated by a pilot motor 33 that is controlled by reversing switches 34 and 35 in accordance with the operation of a contact-making voltmeter or regulator 37.

The pilot motor 33 is provided with a field winding 39 that is energized from any convenient source, such as supply conductors 41 and 42, and with an armature winding 43 that is connected, by means of conductors 44 and 45, to movable contact arms 46 and 47, respectively, of the reversing switches 34 and 35.

The reversing switch 34 comprises the movable contact arm 46 and an electro-magnet 48, the arm 46 carrying movable contact members 51, 52, 53 and 54 that cooperate, respectively, with stationary contact members 56, 57, 58 and 59. A biasing member 60 is provided for normally holding the cooperating pairs of contact members 53—58 and 54—59 in engagement. The reversing switch 35 is similar in construction to the switch 34 and comprises the movable contact arm 47, an electromagnet 62, movable contact members 64, 65, 66 and 67, cooperating stationary contact members 69, 70, 71 and 72, respectively, and a biasing member 74 for normally holding the cooperating pair of contact members 67—72 in engagement.

The stationary contact members 58 and 72 of the reversing switches 34 and 35, respectively, are connected, by means of a conductor 76, to one of the supply conductors 42.

The stationary contact members 57 and 71 of the reversing switches 34 and 35, respectively, are connected, by means of conductors 77 and 78, to the other supply conductor 41 and are adapted to connect one side of the pilot-motor armature 43 to the supply conductor 41 upon the operation of either of the reversing switches to a second operative position.

When the electromagnets of the reversing switches 34 and 35 are unenergized, the switches are biased to the positions illustrated in the drawings to close a circuit from one side of the armature winding 43, through conductor 44, the arm 46 and the cooperating contact members 53 and 58 of the reversing switch 34, conductor 76, the cooperating contact members 72 and 67 and the arm 47 of the reversing switch 35 and conductor 45, to the other side of the armature winding 43, thus closing a dynamic-braking circuit for the motor 33. Upon the operation of the one or the other of the reversing switches to second operative position, the motor is connected to the supply conductors 41 and 42 to be operated in the one or the other direction.

The regulator 37 comprises a core member 80 and an actuating winding 81 therefor that is connected to be energized in accordance with the voltage of the generator 2 through the agency of a voltage transformer 82. The core member 80 is connected to a pivoted lever 83 that carries movable contact members 84, 85 and 86 which cooperate, respectively, with stationary contact members 87, 88 and 89. The regulator also comprises a biasing member 91 that normally opposes the upward pull of the core member 80.

Upon engagement of the contact members 84 and 87, a circuit is completed through the operating winding of the electromagnet 62 to actuate the switch 35 to a second operative position. Upon engagement of the contact members 85 and 88 a circuit is completed through the operating winding of the electromagnet 48 to actuate the switch 34 to a second operating position. Upon engagement of the contact members 86 and 89, a circuit is completed to operate a relay 93 for a purpose to be hereinafter described.

The operation of my system is as follows:

If the voltage of the generator 2 falls below the desired value, the energization of the regulator winding 81 is decreased, thus allowing the lever arm 83 to be drawn downwardly by the biasing member 91 to cause the engagement of the contact members 85 and 88 to establish a circuit through the operating winding of the electromagnet 48, thus actuating the switch 34 to its second operative position.

The operating circuit for the electromagnet 48 extends from the supply conductor 41, through conductor 78, conductor 94, the lever arm 83, the contact members 85 and 88, conductor 95, the operating winding of the electromagnet 48 and the conductor 76, to the supply conductor 42.

The reversing switch 34, when actuated to its second operative position, separates the contact members 53—58 and 54—59 and effects the engagement of the cooperating contact members 51—56 and 52—57. The engagement of contact members 52—57 completes a circuit through the armature winding 43 of the motor 33 which may be traced from the supply conductor 41, through conductor 78, conductor 77, contact members 57—52 and the arm 46 of the reversing switch 34, conductor 44, the armature winding 43, conductor 45, the arm 47 and the contact members 67—72 of the reversing switch 35 and conductor 76, to supply conductor 42 to cause the motor 33 to operate the rheostat 19 in a direction to increase the resistance in circuit with the field winding 17, thus decreasing the excitation and the generated voltage of the auxiliary generator 9. Since the generator 9 is connected in voltage opposition to the generator 8, a decrease in the voltage generated by the auxiliary generator 9 increases the voltage impressed upon the field winding 7, thereby increasing the voltage of the generator 2.

The operation of the reversing switch 34 to its second operative position interrupts a circuit in shunt relation to the resistor 28 which is normally completed through conductor 98, the contact members 54—59, conductor 99 and conductor 100, thus introducing the resistor 28 into the circuit of the field winding 17 and causing the energization thereof to decrease rapidly during the operation of the rheostat 19.

The contact members 51—56 of the reversing switch 34, upon engagement, cause a portion of the resistor 102 to be excluded from the circuit of the regulator winding 81, thus increasing the energization thereof slightly and hastening the disengagement of the contact members 85 and 88 of the regulator to prevent it from hunting When the voltage of the generator 2 again approaches its normal value, the contact members 85 and 88 will be disengaged, and the reversing switch 34 will be immediately biased to its illustrated position, thus closing the above traced dynamic-breaking circuit through the contact members 53—58 and causing the pilot motor 33 to stop promptly. The return of the reversing switch 34 to its illustrated position again shunts the resistor 28 from the circuit of the field winding 17 through the contact members 54—59. If the movement of the regulator rheostat 19 has been sufficient to correct the excitation of the generator 2 and raise its voltage to the normal value, the system will remain at rest until another variation in the voltage of the generator occurs.

If, however, the rapid decrease in the excitation of the auxiliary generator 9, caused by introducing the resistor 28 into the circuit of the field winding 17, has caused the voltage of the generator to rise so rapidly that the correction required in the setting of the rheostat 19 to maintain this voltage has not been made, the voltage of the conductors 4, 5 and 6 will again decrease to cause the regulator contact members 85 and 88 to come into engagement and to continue the operation of the rheostat 19. This action will be continued until the required correction has been made.

If the voltage of the supply-circuit conductors 4, 5 and 6 decreases below a predetermined amount, which may result from a short circuit or other fault upon the supply conductors, the energization of the winding 81 of the regulator 37 will decrease, first causing the engagement of the contact members 85 and 88 and the change in the setting of the rheostat 19, as described above, and, upon a sufficient further downward movement of the lever 83, will cause engagement of the contact members 86 and 89, thus completing a circuit through the operating winding of the relay 93. The circuit for the operating winding of the relay 93 may be traced from the supply conductor 41, through conductor 78, conductor 94, the lever arm 83, contact members 86 and 89, conductor 104, the winding of the relay 93, conductor 105 and conductor 76, to the supply conductor 42.

The relay 93 is, therefore, actuated to cause the disengagement of its contact members 107 and 108 which normally completes a circuit in shunt relation to the resistor 26, thus introducing the resistor 26 into the circuit of the field winding 17 and causing a very rapid decrease in the excitation of the auxiliary generator 9 and a very rapid increase in the voltage of the generator 2.

As the initial rate of change of exciter armature voltage is very much higher when the armature voltage is decreasing than it is when the armature voltage is increasing, it follows that, when the voltage of the regulated generator 9 decreases, with a decrease in the voltage across the conductors 4, 5 and 6, as hereinbefore described, the rate of increase in the voltage impressed upon the generator field winding 7 is much more rapid than could be obtained by increasing the excitation of a single exciter.

It will be noted that the rapid change in the excitation of the field winding 17, caused by the introduction of the resistor 26 into the field-winding circuit, begins just as soon as the relay 93 is energized and its contact members 107 and 108 begin to separate. It is thus apparent that the change in the excitation of the generator field winding 7 takes place sooner than would be the case if the relay operated upon the closure of its contact members to complete a shunting circuit, for excluding a resistor from the field winding circuit to suddenly increase the field current, as is necessary in cases where the voltage of a single exciter has to build up rapidly. Where a single exciter is employed, relatively large contact members are necessary to interrupt the large field current when the voltage of the exciter has increased, but, as the relay 93 interrupts only the normal current traversing the field winding 17, there will be less arcing and burning of the contact members and they may be smaller.

The rapid increase in the generator excitation with a decrease in the voltage of the generator, which is accomplished by connecting the two exciter generators in voltage opposition and the initiation of the corrective action caused by the introducion of the resistor 26 into the field-winding circuit as soon as the contact members 107 and 108 of the relay 93 begin to separate, is of extreme importance and is especially so in cases where the stability of the system to which the generator is connected must be maintained.

If the voltage of the generator increases above its desired value, the energization of the regulator winding 81 is increased, and the core member 80 will be drawn upwardly to cause engagement of the contact members 84 and 87, thus completing a circuit through the operating winding of the electromagnet 62 and causing the reversing switch 35 to be actuated to its second operative position. The operating circuit for the electromagnet 62 may be traced from supply conductor 41, through conductor 78, conductor 94, the lever arm 83, contact members 84 and 87, conductor 109, the operating winding of the electromagnet 62 and the conductor 76, to the supply conductor 42.

Upon the operation of the reversing switch 35 to its second operating position, the pair of cooperating contact members 67—72 are disengaged and the pairs of cooperating contact member 64—69, 65—70 and 66—71 are brought into engagement. The engagement of the contact members 66—71 completes a circuit through the armature winding 43 of the pilot motor 33 to cause the motor to operate in a direction opposite that previously described. The motor circuit may be traced from the supply conductor 41, through conductor 78, conductor 77, the contact members 66—71 and the arm 47 of the reversing switch 35, conductor 45, the armature winding 43, conductor 44, the arm 46 and the contact members 53—58 of the reversing switch 34 and conductor 76, to the supply conductor 42. The pilot motor 33 is, therefore, caused to operate the rheostat 33 in a direction to decrease the resistance in circuit with the field winding 17, thereby increasing the excitation and the generated voltage of the auxiliary generator 9. The increase in the voltage of the generator 9 decreases the voltage impressed upon the field winding 7, thereby decreasing the voltage of the generator 2.

The contact members 65—70 of the reversing switch 35, upon engagement, complete a circuit for shunting the resistor 29 from the circuit of the field winding 17, thereby causing the excitation thereof to rapidly increase during the operation of the rheostat 19. The shunting circuit for the resistor 29 may be traced from one terminal of the resistor 29, through conductor 100, the contact members 65—70 and conductor 112 to the other terminal of the resistor 29.

The contact members 64—69 of the reversing switch 35, upon engagement, establish a circuit through a resistor 114, thereby connecting the resistor 114 in parallel-circuit relation to the regulator winding 81 and thus decreasing the excitation of the winding 81, and hastening disengagement of the contact members 84 and 87 to prevent the regulator from hunting.

When the voltage of the generator has decreased to the desired value, contact members 84 and 87 will be separated, and the reversing switch 35 will be turned to its illustrated position, and will complete the dynamic-braking circuit for the pilot motor 33 through the contact members 67—72, thus stopping the pilot motor. The resistor 29 will then be again introduced into the circuit of the field winding 17 of the auxiliary generator 9 by the separation of the contact members 65 and 70.

If the operation of the regulating rheostat 19 has not been sufficient to maintain the voltage of generator 2 at the desired value, the regulator 37 will again operate, thus causing a further change in the setting of the rheostat 19 to be made in the manner above described.

Since many modifications may be made in the apparatus and circuits described without departing from the spirit of my invention, I do not wish to be limited otherwise than by the scope of the appended claims.

I claim as my invention:

1. In a regulator system, a power circuit, a dynamo-electric machine connected to said power circuit and having a field winding, means for energizing said field winding comprising two exciter generators connected in voltage opposition and having field windings, means for governing the excitation of one of said field windings in accordance with an electrical quantity of the power circuit comprising a variable resistor and a second resistor normally connected in circuit therewith, means operable for gradually actuating said variable resistor, means for short circuiting said second resistor when the regulated quantity varies in one direction, means for introducing a third resistor into the field winding circuit when the regulated quantity varies in the other direction, and means for introducing a fourth resistor into the field-winding circuit when the regulated quantity abruptly varies in one direction.

2. In a regulator system, a power circuit, a dynamo-electric machine connected to the power circuit and having a field winding, means for governing the excitation of said field winding comprising two exciter generators connected in voltage opposition and a field-winding circuit for one of said exciter generators including a rheostat and a plurality of resistors, means responsive to variations in an electrical quantity of the power circuit for operating said rheostat, and a plurality of means operative during the operation of the rheostat for varying the number of resistors connected in the exciter generator field-winding circuit upon certain predetermined variations in the regulated quantity from the desired value.

3. In a regulator system, a power circuit, a dynamo-electric machine having a field winding, means for energizing said field winding comprising a main exciter generator having a field winding and an auxiliary exciter generator having a field winding, said machines being connected in voltage opposition, a variable resistor connected in circuit with the field winding of the auxiliary generator, means responsive to variations of an electrical quantity of the power circuit from a predetermined value for actuating the variable resistor, and means for accelerating the change in the resistance of the auxiliary generator field circuit upon abrupt variations in the electrical quantity of the power circuit from the desired value.

4. In a regulator system, a power circuit, a dynamo-electric machine connected to the power circuit and having a field winding, means for energizing said field winding comprising a substantially constant voltage generator, a variable-voltage generator connected in voltage opposition thereto and having a field winding, means for governing the excitation of the variable-voltage-generator field winding comprising a rheostat connected in circuit therewith, means responsive to variations in an electrical quantity of the power circuit for operating said rheostat, means for abruptly varying the resistance in circuit with the field winding of the variable-voltage generator to rapidly change the resultant voltage generator of the two generators under predetermined variations in the regulated quantity from the desired value.

5. In a regulator system, a power circuit, a dynamo-electric machine connected to said power circuit, a substantially constant-voltage generator and a variable-voltage generator having a field winding, the two generators being connected in voltage opposition to a field winding of said machine, a rheostat connected in circuit with the field winding of said variable-voltage generator, means responsive to variations in the electrical quantity of the power circuit for operating said rheostat, a plurality of resistors in circuit with the field winding of said variable-voltage generator, means for normally shunt-circuiting certain of said resistors, means for opening the shunt circuits to insert the resistors in the circuit for abruptly varying the field-circuit resistance upon predetermined regulating operations, and means for establishing shunt circuits around the resistors that are normally connected in the field circuit upon other predetermined variations in the regulated quantity from the desired value.

6. In a regulator system, a power circuit, a dynamo-electric machine connected to a power circuit and having a field winding, means for energizing said field winding comprising a substantially constant-voltage generator and a variable-voltage generator having a field winding, the two generators being connected in voltage opposition, means for gradually varying the excitation of said variable-voltage generator field winding and means responsive to variations of an electrical quantity of the power circuit to actuate said last named means, and a plurality of means for abruptly varying the excitation of said field winding to vary the resultant voltage of the two generators, a single means for controlling the actuation of the several means upon different predetermined variations of the regulated quantity, the plurality of means being operable during the operation of the means for gradually varying the excitation of said variable-voltage generator field winding.

7. In a regulator system, a power circuit, means for varying an electrical quantity of the power circuit comprising a substantially constant-voltage generator and a variable-voltage generator connected in voltage opposition and having field windings, a variable resistor and a plurality of other resistors connected in the field-winding circuit of the variable-voltage generator for controlling the excitation of said field winding, and a single regulating means actuated in accordance with an electrical quantity of said power circuit for varying the setting of the variable resistor and for controlling circuits in shunt relation to the remaining resistors.

8. In a regulator system, a power circuit, means for controlling an electrical quantity of the power circuit comprising a substantially constant-voltage generator and a variable-voltage generator connected in voltage opposition, a variable resistor and a plurality of non-variable resistors connected in the field-winding circuit of the variable-voltage generator for governing the excitation thereof, regulating means actuated in accordance with an electrical quantity of the power circuit, means controlled by said regulator for actuating said variable resistor upon a variation of the regulated quantity from a predetermined value, means for normally shunting certain of the non-variable resistors from the field circuit, and means controlled by said regulator for inserting the shunted resistors in the field circuit upon different predetermined variations of the regulated quantity from the desired value.

9. In a regulator system, a power circuit, a dynamo-electric machine connected to said power circuit and having a field winding, means for energizing said field winding comprising two exciter generators connected in voltage opposition and a field winding circuit for one of said exciter generators including a rheostat and a plurality of resistors, normally closed circuits in shunt relation to certain of said resistors, a regulator actuated in accordance with a variation of an electrical quantity of said power circuit for controlling the operation of said rheostat, means operative during the operation of said rheostat in one direction for shunting one of said resistors from said field circuit, and means operative during the operation of the rheostat in the other direction for inserting another of said resistors in said circuit.

10. In a regulator system, a power circuit, a dynamo-electric machine connected to said power circuit and having a field winding, means for energizing said field winding comprising two exciter generators connected in voltage opposition and a field winding circuit for one of said exciter generators including a rheostat and a plurality of resistors, normally closed circuits in shunt relation to certain of said resistors, a regulator actuated in accordance with a variation of an electrical quantity of said power circuit for controlling the operation of said rheostat, means operative during the operation of said rheostat in one direction for shunting one of said resistors from said field circuit, means operative during the operation of the rheostat in the other direction for inserting another of said resistors in said circuit, and means operative upon a predetermined vavariation in the regulated quantity for abruptly varying the resistance in said field winding circuit.

11. In a regulator system, a power circuit, a dynamo-electric machine having a field winding, a source of energy for energizing said field winding, and an exciter generator connected in circuit with said field winding in voltage opposition to said source, said exciter generator having a field winding, means for gradually varying the excitation of said exciter generator field winding in the same direction as the voltage of the dynamo-electric machine varies from a desired value, and means operative only during the operation of said last named means for abruptly varying the excitation of the exciter generator in a corresponding direction.

In testimony whereof, I have hereunto subscribed my name this 27th day of January, 1931.

FINN H. GULLIKSEN.